(12) United States Patent
Abdellatif et al.

(10) Patent No.: US 12,381,402 B2
(45) Date of Patent: Aug. 5, 2025

(54) CONFIGURABLE POWER SUPPLY SYSTEM

(71) Applicant: SAFRAN, Paris (FR)

(72) Inventors: Meriem Abdellatif, Moissy-Cramayel (FR); Vincent Pauvert, Moissy-Cramayel (FR); René Meunier, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/285,793

(22) PCT Filed: Apr. 8, 2022

(86) PCT No.: PCT/EP2022/059498
§ 371 (c)(1),
(2) Date: Oct. 5, 2023

(87) PCT Pub. No.: WO2022/214682
PCT Pub. Date: Oct. 13, 2022

(65) Prior Publication Data
US 2024/0195180 A1 Jun. 13, 2024

(30) Foreign Application Priority Data
Apr. 8, 2021 (FR) ...................................... 2103581

(51) Int. Cl.
*H02J 3/46* (2006.01)
*B64C 25/32* (2006.01)
(Continued)

(52) U.S. Cl.
CPC .............. *H02J 3/46* (2013.01); *B64C 25/405* (2013.01); *H02J 1/102* (2013.01); *H02J 3/381* (2013.01);
(Continued)

(58) Field of Classification Search
CPC .... H02J 3/46; H02J 1/102; H02J 3/381; H02J 2310/44; H02J 2310/62; H02J 1/084;
(Continued)

(56) References Cited

U.S. PATENT DOCUMENTS

2019/0393809 A1* 12/2019 Lacaux .................... H02J 3/38
2020/0328585 A1* 10/2020 Jacobson ................. H02H 7/20

FOREIGN PATENT DOCUMENTS

EP          3588729 A1    1/2020
FR          3086926 A1    4/2020

* cited by examiner

*Primary Examiner* — Lincoln D Donovan
*Assistant Examiner* — Alex W Lam
(74) *Attorney, Agent, or Firm* — MUNCY, GEISSLER, OLDS & LOWE, P.C.

(57) ABSTRACT

A power supply system comprising: a first converter module comprising an AC/DC converter and being arranged to produce an intermediate voltage from an input voltage; a second converter module comprising a DC/DC converter and being controllable to use the intermediate voltage to produce selectively at least two distinct output voltage levels; and a control unit arranged to acquire a flight parameter representative of the flight phase and/or of the altitude, and to control the power supply system in such a manner that the second converter module delivers to each electrical system a power supply voltage that depends on the flight parameter and on said electrical system, and that is equal to one of the output voltage levels.

16 Claims, 7 Drawing Sheets

(51) Int. Cl.
*B64D 13/06* (2006.01)
*H02J 1/10* (2006.01)
*H02J 3/38* (2006.01)

(52) U.S. Cl.
CPC .. *B64D 2013/0611* (2013.01); *B64D 2221/00* (2013.01); *H02J 2310/44* (2020.01)

(58) Field of Classification Search
CPC .. H02J 1/14; H02J 4/00; B64C 25/405; B64D 2013/0611; B64D 2221/00; Y02T 50/80
See application file for complete search history.

CONFIGURABLE POWER SUPPLY SYSTEM

The invention relates to the field of powering electrical systems on board aircraft.

BACKGROUND OF THE INVENTION

In modern aircraft, more and more functions are being electrified: electrical energy is replacing, at least in part, energy that used to be mechanical, hydraulic, or pneumatic.

This trend is not recent. Thus, the flight controls of the Airbus A320, which first flew in 1987, are fully electrical.

More recently, the Boeing 787 was designed with a braking system that is electrical: electromechanical actuators replace conventional hydraulic actuators in order to apply a braking force against the friction members (carbon disks) of the brakes fitted to the wheels of the main undercarriages.

At present, the electrified functions of aircraft are all so-called "non-propulsion" functions, but electrification of the so-called "propulsion" function is also under investigation in the medium and long term.

In this context, proposals have been made to incorporate both electrical taxiing systems and also hybrid air conditioning systems in future aircraft and/or in existing aircraft.

An electrical taxiing system enables the aircraft to be moved on the ground without using the aircraft's main engine (s) (and without a towing system). An electrical taxiing system has electric motors that drive certain wheels of the aircraft in rotation. An electrical taxiing system is inactive while the aircraft is in flight, with a possible exception while the aircraft is at low altitude, when it can be advantageous to drive the wheels in rotation immediately prior to the impact of a landing in order to reduce the rotary drive and resilient return forces to which the main undercarriages are subjected. For safety reasons, it is also necessary for an electrical taxiing system to be inactive while the aircraft is stationary on the ground under embarkation or disembarkation conditions, with this applying regardless of whether or not the main engines of the aircraft are stopped.

As for a hybrid air conditioning system (also known as a hybrid environment condition system (ECS)), it serves in particular to renew air and to control ambient temperature and pressurization inside the cabin. On the ground, a hybrid ECS is powered entirely by electrical energy. In flight, a hybrid ECS is powered for the most part by pneumatic energy, with intermittent support by electrical energy.

Both an electrical taxiing system and a hybrid ECS those present electricity consumption that depends on the aircraft's flight phase and/or altitude (and more precisely that decreases with increasing altitude).

This specific feature needs to be taken into account when designing the electrical power supply for such systems.

Specifically, electrical taxiing systems are new, and incorporating them in an aircraft requires the addition of converter members, of protection members, and of cables that pass through zones that are difficult to access (and in particular on/in undercarriages). Specifically, since the system is active only (or nearly only) while on the ground, the weight of this function is considered as dead weight while in flight.

It is therefore essential to optimize this weight so that performing this function is not too penalizing.

For this purpose, it appears to be advantageous to step up (i.e. raise) the voltage level of the electrical taxiing system in order to optimize its weight. Specifically, stepping up the voltage level reduces the amount of current that flows in the cables, and thus makes it possible to reduce the gauge of the cables (i.e. the diameter of the cables), and thus reduce the weight of the system. Reducing the gauge of the cables is also advantageous when installing the cables, since a smaller diameter cable is more flexible and less bulky than a larger diameter cable.

Likewise, with a hybrid ECS, stepping up the voltage level is advantageous for the purpose of reducing the weight of the cables. Nevertheless, the components of an ECS are installed for the most part in a non-pressurized zone, and stepping up the voltage can be problematic at altitude because of electrical discharge phenomena including partial electrical discharges in air, which are disruptive and accompanied by insulation damage or arcing. In particular, the partial discharge zone is reached when the voltage level at altitude exceeds the boundary described by the Paschen curve.

It can thus be seen that each of these systems possesses its own constraints, and that power supply solutions for electrical systems on board aircraft are complicated to optimize in overall and coherent manner.

OBJECT OF THE INVENTION

An object of the invention is to reduce the weight and the cost of one or more electrical systems on board an aircraft, for systems presenting electricity consumption that decreases as a function of the aircraft's flight phase and/or altitude, and to do so without reducing the availability of said electrical system (s).

SUMMARY OF THE INVENTION

In order to achieve this object, there is provided a power supply system arranged to be incorporated in an aircraft by being connected to at least one AC voltage source and to at least one electrical system presenting electricity consumption that depends on the aircraft's flight phase and/or altitude, the power supply system comprising:
  a first converter module comprising an AC/DC converter and being arranged to produce an intermediate voltage from an input voltage produced by the AC voltage source;
  second converter module comprising a DC/DC converter and being controllable to use the intermediate voltage to produce selectively at least two distinct output voltage levels; and
  a control unit arranged to acquire a flight parameter representative of the flight phase and/or of the altitude, and to control the power supply system in such a manner that the second converter module delivers to each electrical system a power supply voltage that depends on the flight parameter and on said electrical system, and that is equal to one of the output voltage levels.

The power supply system of the invention thus makes it possible to power each electrical system with a power supply voltage that depends not only on the electrical system but also on the aircraft's flight phase and/or altitude.

Thus, for systems that are active on the ground and inactive in flight, such as an electrical taxiing system, the power supply system of the invention enables the power supply voltage on the ground to be stepped up so as to be able to reduce the diameter and thus the weight and the bulk of the cables. For systems presenting electricity consumption that is higher on the ground than in-flight, such as a hybrid ECS, the power supply system of the invention makes it possible to increase the power supply voltage on the ground and to reduce it in flight, and therefore likewise to benefit from a reduction in weight without suffering electric discharge problems. This optimization of the power supply takes place without any loss of availability of the electrical systems.

The components of the power supply system of the invention enable a plurality of electrical systems to be powered simultaneously, and in particular both of the types of system that are mentioned above. This pooling of components likewise serves to reduce the weight of such systems, and also serves to reduce their costs.

There is also provided a power supply system as described above, wherein the output voltage levels comprise a first output voltage level that is equal to the intermediate voltage and a second output voltage level that results from the DC/DC converter converting the intermediate voltage.

There is also provided a power supply system as described above, wherein the control unit comprises both a control circuit comprising switches and logic gates, and also a first control module arranged to operate the control circuit as a function of the flight parameter.

There is also provided a power supply system as described above, wherein the control unit comprises a second control module arranged to control the DC/DC converter as a function of the flight parameter so that it either converts the intermediate voltage to produce the second output voltage level, or else performs no conversion.

There is also provided a power supply system as described above, the control unit being arranged to configure the second converter module in such a manner that the DC/DC converter operates selectively either as a step-down voltage converter, with the second output voltage level then being lower than the intermediate voltage, or else as a voltage step-up converter, with the second output voltage level then being higher than the intermediate voltage.

There is also provided a power supply system as described above, the DC/DC converter being a reversible converter.

There is also provided a power supply system as described above, wherein the AC/DC converter is arranged in such a manner that the intermediate voltage can be equal to different intermediate voltage levels, and wherein the control unit includes a configuration module arranged to configure the AC/DC converter in such a manner that the intermediate voltage is equal to one of the different intermediate voltage levels.

There is also provided a power supply system as described above, wherein the intermediate voltage is used for powering electrical devices other than the electrical system(s).

There is also provided a power supply system as described above, the power supply system being connected to a plurality of AC voltage sources, the control unit being arranged to operate the control circuit in such a manner as to select, as a function at least of the flight parameter, one of the AC voltage sources for delivering the input voltage to the first converter module.

There is also provided a power supply system as described above, the AC voltage sources comprising a main source, an APU type auxiliary source, and a ground source, the selection being performed as a function of the flight parameter and of the availability of the APU type auxiliary source.

There is also provided a power supply system as described above, the electrical system(s) comprising an electrical taxiing system.

There is also provided a power supply system as described above, the electrical system(s) comprising an air-conditioning system.

There is also provided an aircraft including a power supply system as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
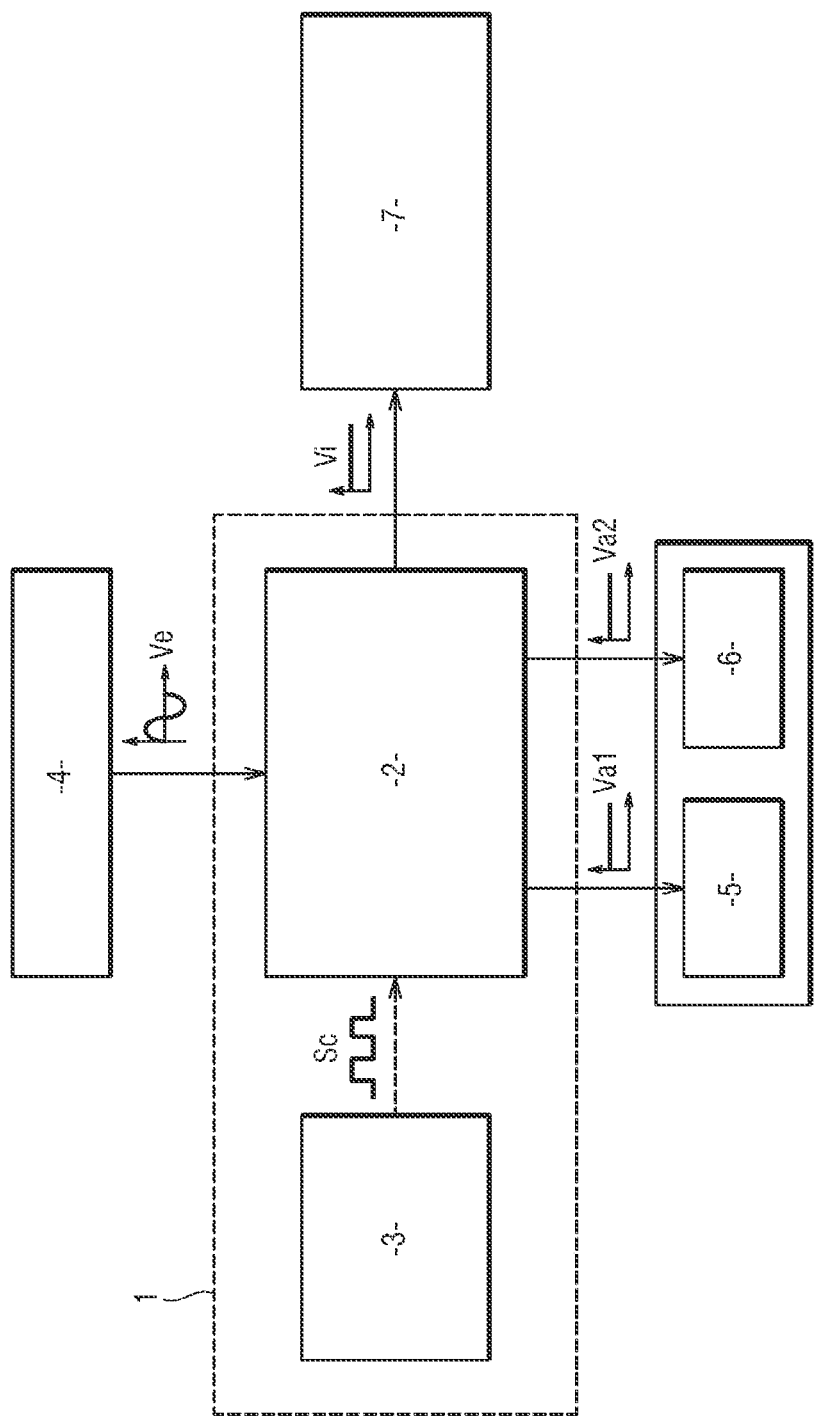
FIG. 1 is a diagram showing an electrical architecture incorporating the power supply system of the invention.

With reference to FIG. 1, the power supply system 1 of the invention is incorporated in an aircraft, which in this example is an airplane.

The power supply system 1 comprises a power unit 2 and a control unit 3 that produces control signals Sc for operating the power unit 2.

The power supply system 1 is connected to power sources 4 that produce alternating current (AC) input voltages Ve. The power supply system 1 uses the input voltages Ve to produce a direct current (DC) intermediate voltage Vi, a first DC power supply voltage Va1 for powering an electrical taxiing system 5, and a second DC power supply voltage Va2 for powering a hybrid ECS 6. The intermediate voltage Vi also serves to power other electrical devices 7.

Figure 2:
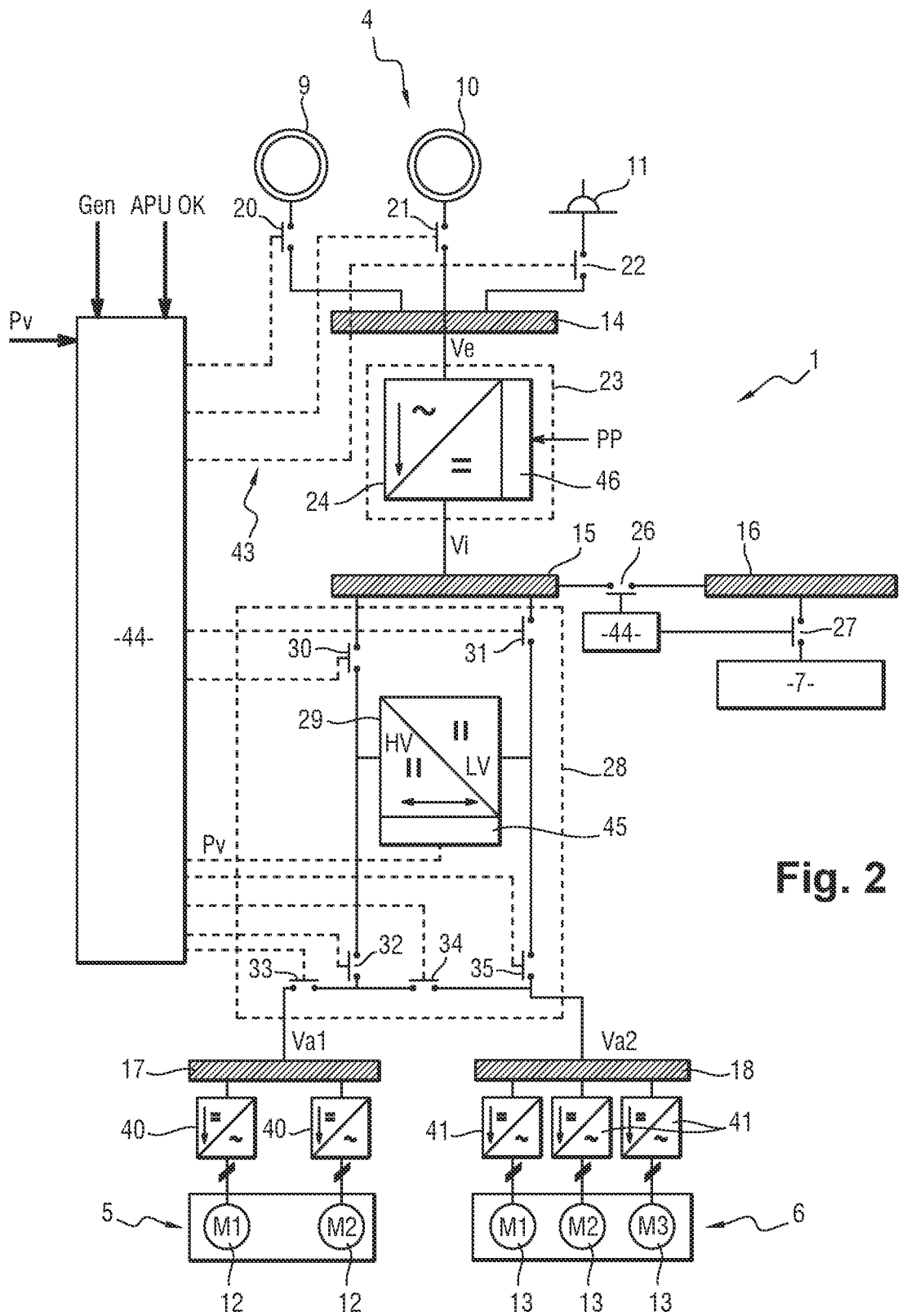
FIG. 2 is a figure similar to FIG. 1, but in greater detail.

With reference to FIG. 2, the power sources 4 comprise a main source 9 that produces electricity from generators incorporated in the airplane engines and that generates a main voltage, and an auxiliary source 10 (or "auxiliary power unit" (APU)) that produces an auxiliary voltage from generators coupled to turbines that are generally provided in the tail of the airplane, these two power sources (main and auxiliary) thus being specific to the airplane (i.e. being incorporated therein). The power sources 4 also comprise a ground source 11 (or "ground power unit" (GPU)) to which the airplane systems can be connected via a parking outlet socket when the airplane is stationary on the ground, which ground source produces a voltage referred to as "GPU voltage".

In this example, the electrical taxiing system 5 has two electric motors 12, each arranged to drive a respective one of the wheels of the airplane in rotation.

In this example, the hybrid ECS 6 has three electric motors 13.

The power unit 2 has an upstream busbar 14, a first intermediate busbar 15, a second intermediate busbar 16, a first downstream busbar 17, and a second downstream busbar 18. In accordance with the definition given by the international electronic commission, the term "busbar" (also spelled "bus bar" or "bussbar") designates a conductor of low impedance that can be connected to a plurality of electrical circuits at separate points.

The main source 9 is connected to the upstream busbar 14 via a power switch 20. The auxiliary source 10 is connected to the upstream busbar 14 via a power switch 21. The ground source 11 is connected to the upstream busbar 14 via a power switch 22. These switches are controlled as a function of the flight parameter and of the availability of the auxiliary source so that one of the various sources powers the upstream busbar 14. The power unit 2 also has a first converter module 23 that comprises an AC/DC converter 24, i.e. a converter that converts an AC voltage into a DC voltage.

The first converter module 23 is arranged to produce the DC intermediate voltage Vi from any one of the AC input voltages.

The output of the AC/DC converter 24 is connected to the first intermediate busbar 15. The second intermediate busbar 16 is connected to the first intermediate busbar 15. A switch 26 is connected between the first intermediate busbar 15 and the second intermediate busbar 16. A switch 27 is connected between the second intermediate busbar 16 and the electrical devices 7.

The power unit 2 also has a second converter module 28 that comprises a DC/DC converter 29, i.e. a converter that converts one DC voltage into another DC voltage.

The second converter module 28 is controllable to use the intermediate voltage Vi to produce selectively at least two distinct output voltage levels. In this example, the output voltage levels comprise a first output voltage level equal to the intermediate voltage Vi (the first output voltage level is thus generated without passing via the DC/DC converter 29), a second output voltage level that results from the intermediate voltage Vi as converted by the DC/DC converter 29, and a zero voltage level.

The first output voltage level and the second output voltage level comprise a high output voltage level and a low output voltage level.

The DC/DC converter 29 has a high voltage port HV and a low voltage port LV.

The DC/DC converter 29 is reversible, i.e. energy can flow from the high voltage port HV to the low voltage port LV, or else from the low voltage port LV to the high voltage port HV. Thus the DC/DC converter 29 can generate a high voltage on the high voltage port HV from a low voltage applied to the low voltage port LV, and it can generate a low voltage on the low voltage port LV from a high voltage applied to the high voltage port HV.

The DC/DC converter 29 being reversible is particularly advantageous when the electrical power sources deliver voltage levels that are different.

The high voltage port HV is connected to the first intermediate busbar 15 via a switch 30. The low voltage port LV is connected to the first intermediate busbar 15 via a switch 31.

The second converter module 28 also has switches 30, 31, 32, 33, 34, and 35.

The high voltage port HV is connected to the first downstream busbar 17 via the switch 32 and the switch 33, and to the second downstream busbar 18 via the switch 32 and the switch 34. The low voltage port LV is connected to the first downstream busbar 17 via the switch 35 and the switches 33 and 34, and to the second downstream busbar 18 via the switch 35.

The power unit 2 also has the cables that convey the currents for powering the electrical taxiing system 5 and the hybrid ECS 6.

The control unit 3 is arranged to acquire a flight parameter Pv representative of the airplane's flight phase and/or altitude, and to control the power supply system 1 in such a manner that the second converter module 28 delivers to each electrical system a power supply voltage that depends on the flight parameter Pv and on said electrical system: the second converter module 28 delivers a first power supply voltage Va1 to the electrical taxiing system 5 and a second power supply voltage Va2 to the hybrid ECS 6. Each power supply voltage is equal to one of the output voltage levels. The power supply voltages Va1 and Va2 may thus differ depending on the electrical systems to be powered and/or on altitude and/or on flight phase.

By way of example, the flight parameter Pv may be specifically the altitude of the airplane, or else the flight phase, or else information that the altitude is higher or lower than a predetermined threshold, or else any other parameter that is representative of the airplane's flight phase and/or altitude.

The first power supply voltage Va1 thus powers first DC/AC converters 40 that in turn power the electric motors 12 of the electrical taxiing system 5. The second power supply voltage Va2 thus powers second DC/AC converters 41 that in turn power the electric motors 13 of the hybrid ECS system 6.

The control unit 3 includes a processor circuit comprising at least one processor component, which, by way of example, may be a general-purpose processor, a processor specialized in signal processing (known as a digital signal processor (DSP)), a microcontroller, or indeed a programmable logic circuit such as a field programmable gate array (FPGA) or an application-specific integrated circuit (ASIC). The processor circuit also comprises one or more memories that are connected to or incorporated in the processor component. At least one of these memories constitutes a computer-readable storage medium, storing a computer program including instructions that enable the processor component to execute at least some of the steps of the configuration method that is described below.

The control unit 3 also comprises a control circuit 43, a first control module 44, a second control module 45, and a configuration module 46. The elements 43, 44, 45, and 46 may possibly be implemented at least in part in the processor circuit.

The control circuit 43 comprises the above-mentioned switches, logic gates that are described below, and lines for conveying the control signals for operating the switches.

The first control module 44 acquires the flight parameter Pv and operates the control circuit 43 as a function of the flight parameter Pv. In particular, the first control module 44 operates the switches 26 and 27 in order to power or not power the electrical devices 7.

The first control module 44 also acquires both an information signal Gen relating to the main source 9 and that is representative of the level of the main voltage (which may be a high main voltage or a low main voltage depending on how the electrical architecture of the airplane is designed), and also a state signal APU_OK relating to the state and the availability of the auxiliary source 10.

As explained above, the second converter module 28 can produce a first output voltage level that is equal to the intermediate voltage Vi, a second output voltage level that results from the DC/DC converter 29 converting the intermediate voltage Vi, and a zero voltage level.

The control unit 3 configures the second converter module 28 in such a manner that the DC/DC converter 29 functions selectively either as a step-down voltage converter, with the second output voltage level then being lower than the intermediate voltage, or else as a voltage step-up converter, with the second output voltage level then being higher than the intermediate voltage.

The second control module 45 controls the DC/DC converter 29 as a function of the flight parameter Pv so that either it converts the intermediate voltage Vi to produce the second output voltage level, or else it performs no conversion.

The intermediate voltage Vi as produced by the AC/DC converter 24 may be equal to two intermediate voltage levels: a high level and a low level; with this applying regardless of the voltage levels of the power sources 9, 10, and 11. The intermediate voltage may thus be a high intermediate voltage Vi_H or a low intermediate voltage Vi_L.

The configuration module 46 serves to configure the AC/DC converter 24 so that the intermediate voltage Vi is equal to one of the intermediate voltage levels. This configuration serves to adapt the level of the intermediate voltage Vi as a function of the power supply requirements of the electrical devices 7. This characteristic thus makes it possible to incorporate the power supply system 1 in various different architectures (and different aircraft) in order to power systems of different types that require different power supply voltages.

The configuration module 46 comprises a so-called "pin-programming" port PP that enables the configuration module 46 to be "hard-wired" so that it configures the AC/DC converter 24 to produce selectively either the high intermediate voltage or the low intermediate voltage. The configuration module 46 delivers a corresponding logic signal HV_OK (see FIGS. 3 and 4), to the converter module 28, the high or low state of the logic signal representing the hard configuration. This programming of the configuration module 46 depends on the configuration of the airplane architecture and on the power supply requirements for the other electrical systems 7; it is independent of the airplane's flight phase or altitude.

The AC/DC converter 24 is an active rectifier designed to accommodate the highest output DC voltage and the lowest input AC voltage.

It should be observed that the control unit 3 includes at least one processor component that is adapted to execute instructions of at least one program in order to implement the first control module 44, the second control module 45, and the configuration module 46. The program may be stored in a memory that is connected to or incorporated in the processor component. By way of example, the processor component may be a processor, a digital signal processor (DSP), a microcontroller, or indeed a programmable logic circuit such as a field programmable gate array (FPGA) or an application-specific integrated circuit (ASIC).

It should also be observed that the presently-described control architecture is an architecture that is centralized: the first control module 44 acquires the input signals (Pv, Gen, APU_OK), processes them, and transmits control signals to the switches of the control circuit 43 and to the second control module 45. The architecture could equally well be decentralized (or distributed), with each control module then acquiring the input signals in order to produce control signals for the electrical member with which it is associated. It is also possible to envisage an architecture that is hybrid.

The operation of the power supply system 1 is described below in greater detail with reference to FIGS. 3 and 4. In order to make FIGS. 3 and 4 easier to read, the second intermediate busbar 16 and the electrical devices 7 are not shown.

Figure 3:
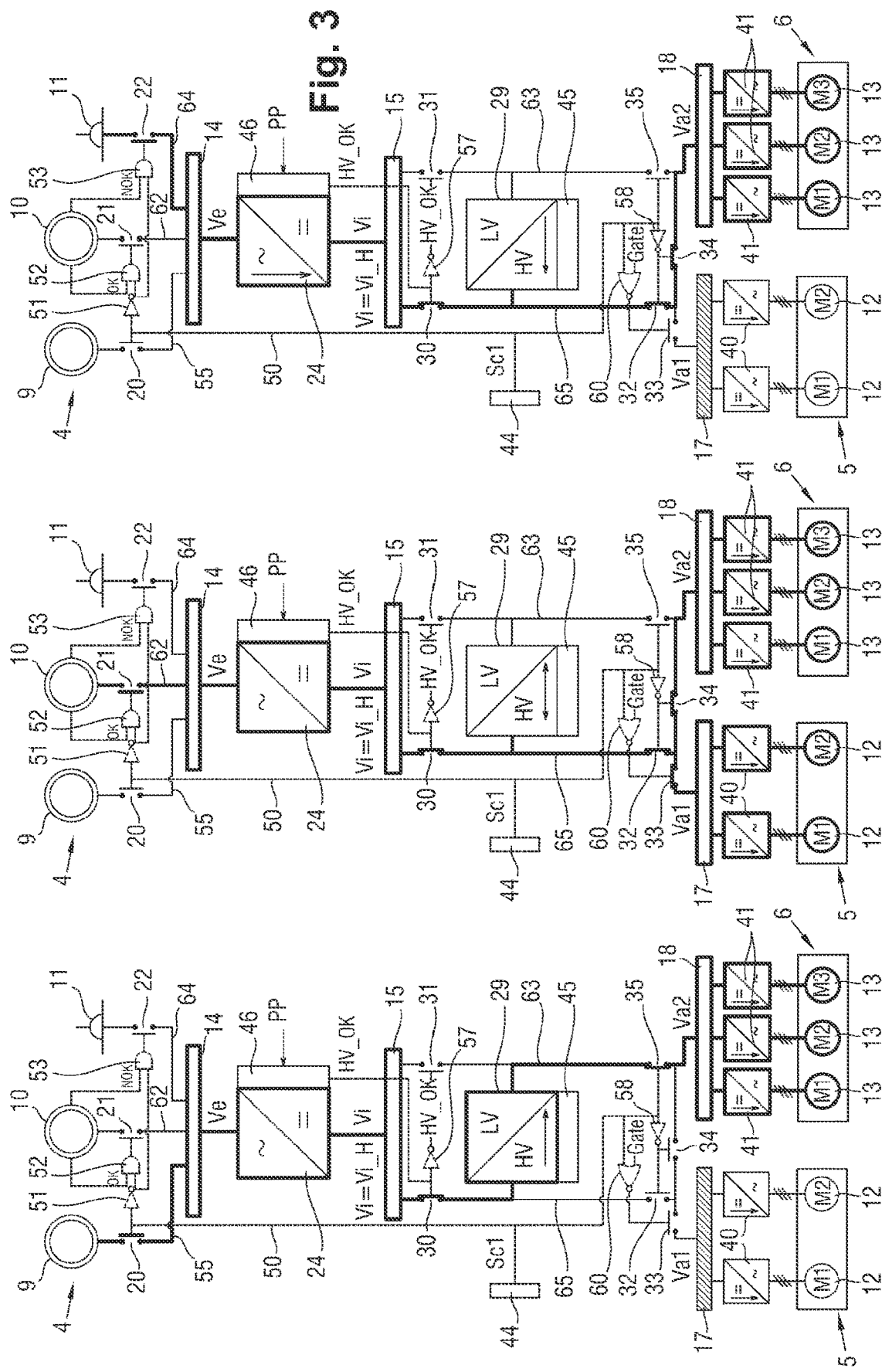
FIG. 3 comprises three diagrams showing the path taken by electrical energy through the FIG. 2 architecture in three distinct flight phases, for the situation in which the AC/DC converter produces a high intermediate voltage.

FIG. 3 relates to a situation in which the electrical devices 7 are to be powered with the high intermediate voltage: the intermediate voltage Vi at the first intermediate busbar 15 is thus equal to the high intermediate voltage Vi_H. The configuration module 46 is thus pin-programmed so that the AC/DC converter 24 produces the high intermediate voltage Vi_H.

Figure 4:
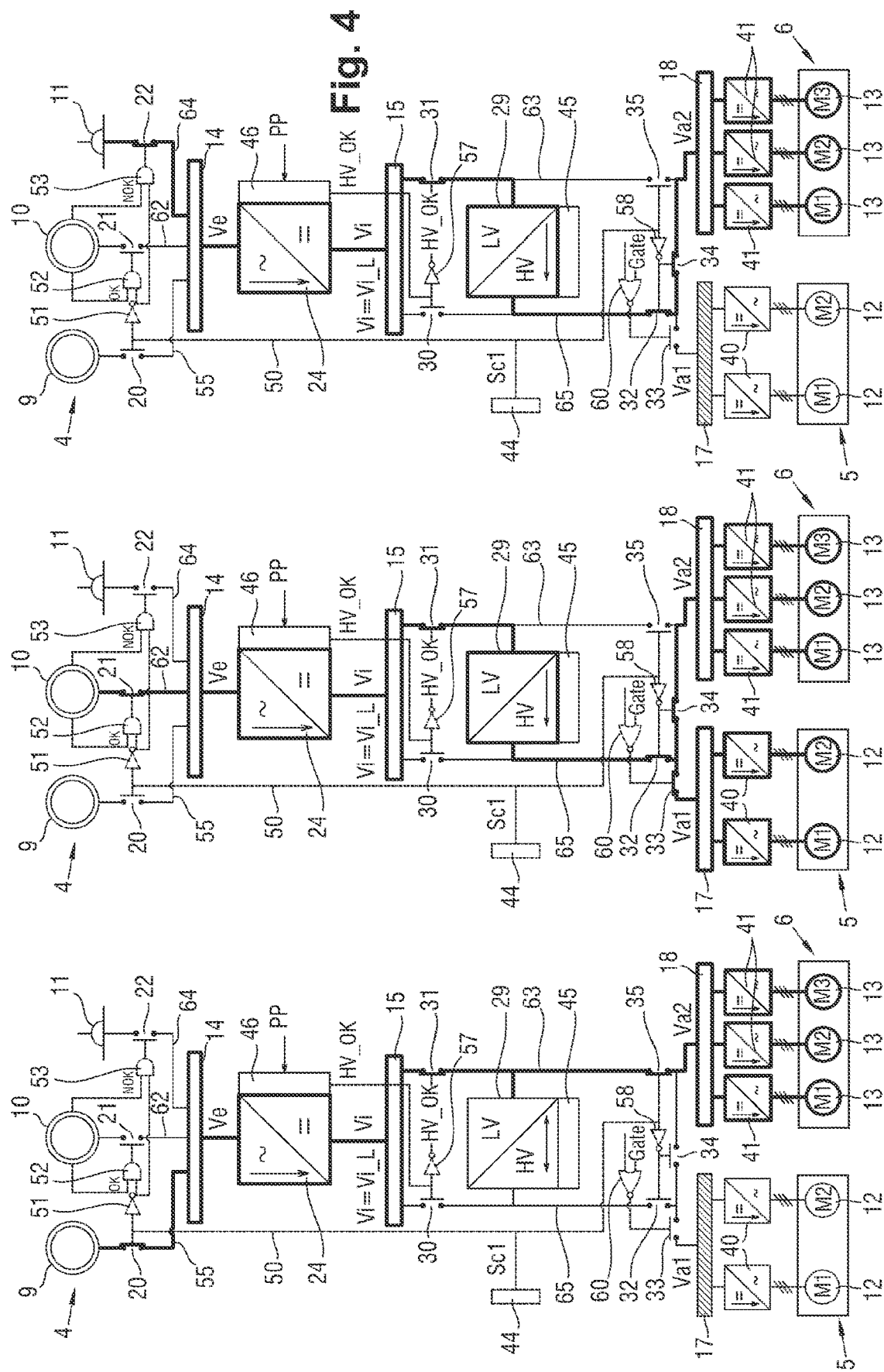
FIG. 4 is a figure similar to FIG. 3 in the situation where the AC/DC converter produces a low intermediate voltage.

FIG. 4 relates to a situation in which the electrical devices 7 are to be powered with the low intermediate voltage: the intermediate voltage Vi at the first intermediate busbar 15 is thus equal to the low intermediate voltage Vi_L. The configuration module 46 is thus pin-programmed so that the AC/DC converter 24 produces the low intermediate voltage Vi_L.

In FIGS. 3 and 4, bold lines are power lines that convey electrical energy. Thin lines are power lines that do not convey electrical energy. Dashed lines are lines of the control circuit 43 that convey the control signals.

In each configuration of each of FIGS. 3 and 4, the first control module 44 of the control unit 3 acquires the flight parameter Pv representative of the flight phase and/or of the altitude, the state signal APU_OK and the information signal Gen.

The first control module 44 uses the state signal APU_OK to generate the state signals OK, NOK.

The following convention is used, which is compatible with the choice of logic gates in the examples shown:
if the auxiliary source 10 is available, then the state signals APU_OK, OK, and NOK are as follows: APU_OK=1 (high state) and (OK, NOK)=(1, 0);
if the auxiliary source 10 is not available, then APU_OK=0 (low state) and (OK, NOK)=(0, 1);
the first control module 44 also generates a control signal Sc1. The following convention is used: while the aircraft is in flight, Sc1=1; and
while the aircraft is on the ground, Sc1=0.

The term "in flight" is used herein to mean that the main engines of the airplane are not shut down. It should be observed that the airplane is in the "in-flight" state when it is "at the gate" (i.e. the main engines of the airplane are running in preparation for a flight phase).

Thus, the electrical taxiing system is not to be powered while the airplane is in a stage of flight nor when the airplane is at the gate.

The signal Gate, likewise by convention, is such that:
while the airplane is in a stage of embarkation or of disembarkation, Gate=1; and
once the stage of embarkation or of disembarkation has terminated and the door(s) giving access to the airplane are closed, Gate=0.

The logic used for selecting and connecting power sources is as follows. Each power source (main source 9, auxiliary source 10, and ground source 11) is connected by a respective power switch 20, 21, or 22 to the upstream busbar 14.

In a stage of flight, the control signal Sc1 opens the switch 20 and forces the switches 21 and 22 into the non-conductive state. On the ground, the control signal Sc1 makes the switch 20 non-conductive, and it is the availability of the auxiliary source 10 that determines which one of the switches 21 and 22 is open. The switches 21 and 22 are easily controlled as a function of the control signal Sc1 and of the state signal APU_OK (or of the state signals OK and NOK) by means of a NOT gate 51 for obtaining a logic signal that is the inverse of the control signal Sc1, and by means of two two-input AND gates 52 and 53, one of which inputs is operated by the inverse of the control signal Sc1, and the other of which receives respectively either the state signal OK for operating the switch 21 associated with the auxiliary source 10, or the state signal NOK for operating the switch 22 associated with the ground source 11.

The left-hand diagram in FIG. 3 corresponds to the following conditions: the airplane is in flight and the auxiliary source APU 10 is available.

Thus:
Sc1=1;
Gate=0; and
APU_OK=1.

The electrical taxiing system 5 is not to be activated, and is therefore not to be powered. The hybrid ECS 6 is powered in part only by electrical energy, and a low output voltage level is sufficient for operating it.

Under such conditions, and in accordance with the invention, the first control module 44 produces, on the line 50, a control signal Sc1 corresponding to the flight parameter. In this example, the control signal Sc1 is in the high state, thereby making the switch 20 conductive, i.e. closing it. The main voltage generated by the main source 9, which may be a high main voltage or a low main voltage, is thus applied to the upstream busbar 14.

The control signal is also applied to one of the inputs of the NOT gate 51, which therefore produces a low state. The low state is applied to a first input of a first AND gate 52.

Since the auxiliary source 10 is available, it generates a state signal APU_OK in the high state. The state signal OK is thus in the high state and the state signal NOK is in the low state.

The control signal Sc1 in the low state forces the switches 21 and 22 into the non-conductive state (open).

Thus, electrical energy is conveyed on the power supply line 55 only; the voltage applied to the upstream busbar 14 is the voltage delivered by the main source, and is referred to below as the "main" voltage.

The input voltage Ve applied as input to the AC/DC converter 24 is thus the main voltage. The pin-programming signal PP is such that the configuration module 46 configures the AC/DC converter 24 so that the intermediate voltage Vi that it produces is equal to the high intermediate voltage Vi_H. The high intermediate voltage Vi_H is thus applied to the first intermediate busbar 15 and powers the electrical devices.

Because of the value of the pin-programming signal PP, the configuration module 46 generates a configuration signal HV_OK in the high state, which has the effect of making the switch 30 conductive. The inverse logic signal HV_NOK at the output from the NOT gate 57 makes the switch 31 non-conductive. An open circuit (high impedance) is thus formed between the first intermediate busbar 15 and the low-voltage port of the DC/DC converter 29.

Since the switch 30 is conductive, the intermediate voltage Vi is applied to the high-voltage port HV of the DC/DC converter 29. Likewise, the second control module 45 receives the control signal Sc1 in the high state corresponding to an aircraft in flight, and operates the DC/DC converter 29 as a voltage step-down converter so that it converts the intermediate voltage Vi into a low output voltage level.

Since the control signal Sc1 is in the high state, the switch 35 is also conductive. The low output voltage level as produced by the DC/DC converter 29 on its low-voltage port LV is thus applied to the second downstream busbar 18. The second power supply voltage Va2 powering the second DC/AC converters 41, and thus the electric motors 13 of the hybrid ECS 6, is thus equal to the low output voltage level delivered by the DC/DC converter 29 from the main voltage delivered by the main source 9 and applied as the input voltage Ve to the AC/DC converter 24. This path is drawn with bold lines.

Since the control signal Sc1 is in the high state, the switch 32 and the switch 34 are both non-conductive. An open circuit is thus formed between the high-voltage port HV of the DC/DC converter 29 and the first downstream busbar 17, and between the high-voltage port HV of the DC/DC converter 29 and the second downstream busbar 18. The voltage on the first downstream busbar 17 is zero, and thus the first power supply voltage Va1 is zero and the DC/AC converters 40 of the electrical taxiing system 5 are not powered.

It should be observed that the control signal Sc1 in the high state is also applied to a first input of a NOR gate 60. The signal Gate is applied to a second input of the NOR gate 60. The signal Gate relates to the airplane on the ground. It is in the high state when the airplane is stationary and it is desired, for safety reasons, to prevent the taxiing system being activated. Otherwise, the signal Gate is in the low state. The output of the NOR gate 60 in this example is thus forced into the low state by the control signal Sc1, thereby making the switch 33 non-conductive and preventing the electrical taxiing system from being powered.

Thus, in addition to controlling the delivery of the first power supply voltage Va1, an interlock logic system is implemented in order to perform an associated safety function: as explained above, the electrical taxiing system is not to be powered when the airplane is in flight, nor is it to be powered when the airplane is stationary during a stage of embarkation and/or disembarkation. This interlock logic is performed by the switch 33 operated by the two-input logic gate, specifically a NOR gate 60, the first input being a signal that is a function of the flight parameter Pv (specifically the control signal Sc1); the second input being a signal that is a function of parking information (specifically the signal Gate).

When the taxiing system is not to be powered, the switch 33 serves to isolate the first downstream busbar 17 from the second converter module 28 and the first power supply voltage Va1 on the first downstream busbar 17 is then equal to 0 volts (V).

The middle diagram in FIG. 3 corresponds to a situation in which the airplane is on the ground, the electrical taxiing system 5 is activated and powered, and the hybrid ECS 6 is powered entirely by electrical energy. A high output voltage level is necessary for powering the electrical taxiing system 5 and the hybrid ECS 6.

The main source 9 is not used (i.e. it may either be unavailable, or else it may be available but not used). The auxiliary source 10 is available.

Thus:
Sc1=0;
Gate=0; and
APU_OK=1.

On the basis of the flight parameter Pv, the first control module 44 thus produces a control signal Sc1 having the low state on the line 50. The switch 20 is thus non-conductive.

Since the auxiliary source 10 is available, the switch 21 is conductive and the switch 22 is non-conductive.

The upstream busbar 14 is then powered by the auxiliary source 10 via the line 62. The voltage of the auxiliary source, which may be a high auxiliary voltage or a low auxiliary voltage, is thus applied to the upstream busbar 14.

The input voltage Ve applied as input to the AC/DC converter 24 is thus equal to the auxiliary voltage.

The pin-programming signal PP is such that the configuration module 46 configures the AC/DC converter 24 so that the intermediate voltage Vi that it produces is equal to the high intermediate voltage Vi_H. The high intermediate voltage Vi_H is thus applied to the first intermediate busbar 15 and powers the electrical devices.

Under such conditions, the configuration module 46 generates a configuration signal HV_OK in the high state to make the switch 30 conductive and to make the switch 31 non-conductive (by the signal HV_NOK). An open circuit (high impedance) is thus formed between the first intermediate busbar 15 and the low-voltage port LV of the DC/DC converter 29.

Since the switch 30 is conductive, the intermediate voltage Vi (high intermediate voltage) is applied to the high-voltage port HV of the DC/DC converter 29. The second control module 45 that receives the signal Sc1 in the low state then operates the DC/DC converter 29 so that it does not perform conversion. Thus no current flows in the line 63. The switch 35 controlled by the control signal Sc1 (issued by the first control module 44) and connected in series between the power supply line 63 and the busbar 18 of the hybrid ECS 6, is indeed non-conductive (open).

Conversely, the switches 32 and 34 (as controlled by the control signal Sc1 via the NOT gate 58) are conductive. Likewise, the switch 33 is conductive (closed) since both of the signals Sc1 and Gate are in the low state. The electrical taxiing system 5 and the hybrid ECS 6 are thus both powered from the intermediate busbar 15 at the high intermediate voltage Vi_H delivered by the auxiliary source 10 (and the AC/DC converter 24), via the switch 30, the line 65, the switch 32, and the switch 33 for the electrical taxiing system 5, or the switch 34 for the ECS. This path is drawn with bold lines.

In other words, the high intermediate voltage Vi_H coming directly from the first intermediate busbar 15 is applied both to the first downstream busbar 17 and also to the second downstream busbar 18. The first power supply voltage Va1 and the second power supply voltage Va2 are thus both equal to the high output voltage level. The first power supply voltage Va1 and the second power supply voltage Va2 power respectively the first DC/AC converters 40 and thus the electric motors 12 of the electrical taxiing system 5, and the second DC/AC converters 41 and thus the electric motors 13 of the hybrid ECS 6.

In the right-hand diagram of FIG. 3, the airplane is on the ground and stationary: the signal Gate is activated, in the high state. The electrical taxiing system 5 is not to be activated, and is not to be powered. The hybrid ECS 6 is powered entirely by electrical energy. A high output voltage level is necessary for powering the hybrid ECS 6.

The main source 9 and the auxiliary source 10 are both unavailable. The ground source 11 is used.

Thus:

Sc1=0;
Gate=1; and
APU_OK=0.

The first control module 44 produces a control signal Sc1 having the low state on the line 50. The switch 20 is thus non-conductive. Since the auxiliary power supply source 10 is not available, the state signal OK is at 0 and the state signal NOK is at 1, and the switch 21 is non-conductive while the switch 22 is conductive. The upstream busbar 14 is isolated both from the main source 9 and from the auxiliary source 10; and the GPU voltage (low GPU voltage) is applied to the upstream busbar 14. Thus, electrical energy is conveyed by the line 64.

The input voltage Ve applied as input to the AC/DC converter 24 is thus the GPU voltage.

The pin-programming signal PP is such that the configuration module 46 configures the AC/DC converter 24 so that the intermediate voltage Vi that it produces is equal to the high intermediate voltage Vi_H. The high intermediate voltage Vi_H is thus applied to the first intermediate busbar 15 and powers the electrical devices.

Under such conditions, the configuration module 46 generates a configuration signal HV_OK in the high state and applies it to make the switch 30 conductive and to make the switch 31 non-conductive (by the signal HV_NOK). An open circuit (high impedance) is thus formed between the first intermediate busbar 15 and the low-voltage port LV of the DC/DC converter 29.

Since the switch 30 is conductive, the intermediate voltage Vi (high intermediate voltage Vi_H) is applied to the high-voltage port HV of the DC/DC converter 29. The second control module 45 uses the signal Sc1 in the low state to operate the DC/DC converter 29 so that it does not perform conversion. Thus no current flows in the line 63.

The control signal Sc1 in the low state makes the switch 35 non-conductive and makes the switches 32 and 34 conductive.

The high output voltage level coming directly from the first intermediate busbar 15 is thus applied to the second downstream busbar 18. The second power supply voltage Va2 is thus equal to the high output voltage level and it powers the second DC/AC converters 41 and thus the electric motors 13 of the hybrid ECS 6.

The signal Gate in the high state forces the output of the NOR gate 60 into the low state, so the switch 33 is indeed non-conductive: the DC/AC converters 40 of the electrical taxiing system 5 are not powered.

The voltage on the first downstream busbar 17 is zero and the first power supply voltage Va1 is zero: the DC/AC converters 40 of the electrical taxiing system 5 are not powered.

In the left-hand diagram of FIG. 4, the airplane is in flight. The electrical taxiing system 5 is deactivated, and is not to be powered. The hybrid ECS 6 is powered in part only by electrical energy, and a low output voltage level is sufficient for it to function.

Thus:

Sc1=1;
Gate=0; and
APU_OK=1.

The first control module 44 produces a control signal Sc1 in the high state on the line 50 making the switch 20 conductive. The main voltage delivered by the main source 9, which may be a high main voltage or a low main voltage, is thus applied to the upstream busbar 14.

The auxiliary source 10 is also available (the state signal OK is in the high state, the state signal NOK being in the low state), but the control signal Sc1 (applied as input to the NOT gate 51) forces the switches 21 and 22 into the non-conductive state.

Thus, electrical energy is conveyed on the line 55, and the voltage applied to the upstream busbar 14 is the main voltage.

The input voltage Ve that is applied as input to the AC/DC converter 24 is thus the main voltage.

The pin-programming signal PP is such that the configuration module 46 configures the AC/DC converter 24 so that the intermediate voltage Vi that it produces is equal to the low intermediate voltage Vi_L. The low intermediate voltage Vi_L is thus applied to the first intermediate busbar 15 and powers the electrical devices.

Under such conditions, the configuration module 46 generates a configuration signal HV_OK in the low state that makes the switch 30 non-conductive. An open circuit (high impedance) is thus formed between the first intermediate busbar 15 and the high-voltage port HV of the DC/DC converter 29.

Since the switch 31 is conductive (the signal HV_NOK being in the high state), the intermediate voltage Vi is applied to the low-voltage port LV of the DC/DC converter 29. The second control module 45 uses the control signal Sc1 in the high state to operate the DC/DC converter 29 so that it does not perform conversion.

Since the control signal Sc1 is in the high state, the switch 35 and the switch 20 are both conductive. The low output voltage level coming directly from the first intermediate busbar 15 is thus applied to the second downstream busbar 18. The second power supply voltage Va2 is thus equal to the low output voltage level and it powers the second DC/AC converters 41 and thus the electric motors 13 of the hybrid ECS 6.

Since the control signal Sc1 is in the high state, the switch 32 and the switch 34 are both non-conductive. An open circuit is thus formed between the first intermediate busbar 15 and the first downstream busbar 17. The voltage on the first downstream busbar 17 is zero, and thus the first power supply voltage Va1 is zero. The first DC/AC converters 40 of the electrical taxiing system 5 are not powered.

As explained above, since the control signal Sc1 is in the high state, it forces the output of the NOR gate 60 into the low state, such that the switch 33 is non-conductive.

In the middle diagram of FIG. 4, the airplane is on the ground. The electrical taxiing system 5 is activated and is powered. The hybrid ECS 6 is powered entirely by electrical energy. A high voltage is then necessary for powering the electrical taxiing system 5 and the hybrid ECS 6.

The main source 9 is not used; the auxiliary source 10 is available.

Thus:
  Sc1=0;
  Gate=0; and
  APU_OK=1.

The first control module 44 produces a control signal Sc1 having a low state on the line 50, thereby making the switch 20 non-conductive. Since the auxiliary source 10 is available, the switch 21 is conductive and the switch 22 is non-conductive.

Thus, electrical energy is conveyed by the line 62.

The input voltage Ve that is applied as input to the AC/DC converter 24 is thus the auxiliary voltage.

The pin-programming signal PP is such that the configuration module 46 configures the AC/DC converter 24 so that the intermediate voltage Vi that it produces is equal to the low intermediate voltage Vi_L. The low intermediate voltage is thus applied to the first intermediate busbar 15 and powers the electrical devices.

Under such conditions, the configuration module 46 generates a configuration signal HV_OK in the low state that makes the switch 30 non-conductive. The signal HV_NOK is in the high state and causes the switch 31 to be conductive.

Since the switch 31 is conductive, the intermediate voltage Vi (low intermediate voltage) is applied to the low-voltage port LV of the DC/DC converter 29. The second control module 45 operates the DC/DC converter 29 on the basis of the signal Sc1 so that it converts the low intermediate voltage Vi_L into a high output voltage level, which is thus delivered to the high voltage port HV. The DC/DC converter 29 is thus used as a step-up converter.

Since the control signal Sc1 is in the low state, the switch 35 is non-conductive, and the switches 32 and 34 are conductive. Since the signal Gate is likewise in the low state, the output of the NOR gate 60 is in the high state, so the switch 33 is conductive.

The high output voltage level coming from the DC/DC converter 29 is thus applied to the first downstream busbar 17 and to the second downstream busbar 18. The first power supply voltage Va1 and the second power supply voltage Va2 are thus equal to the high output voltage level, Va1 and Va2 powering respectively the first DC/AC converters 40 and thus the electric motors 12 of the electrical taxiing system 5, and the second DC/AC converters 41 and thus the electric motors 13 of the hybrid ECS 6.

In the right-hand diagram of FIG. 4, the airplane is on the ground. The electrical taxiing system 5 is deactivated and is not be powered. The hybrid ECS 6 is powered entirely by electrical energy. A high output voltage level is necessary for powering the hybrid ECS 6. The main source 9 and the auxiliary source 10 are both unavailable; the ground source 11 is used.

Thus:
  Sc1=0;
  Gate=1; and
  APU_OK=0.

The first control module 44 produces a control signal Sc1 having a low state on the line 50, thereby making the switch 20 non-conductive. Since the control signal Sc1 is in the low state and the auxiliary power supply source 10 is not available, the switch 21 is non-conductive while the switch 22 is conductive. The GPU voltage, which is a low voltage, is thus applied to the upstream busbar 14.

Thus, electrical energy is conveyed by the line 64.

The input voltage Ve input to the AC/DC converter 24 is thus the GPU voltage.

The pin-programming signal PP is such that the configuration module 46 configures the AC/DC converter 24 so that the intermediate voltage Vi that it produces is equal to the low intermediate voltage Vi_L. The low intermediate voltage is thus applied to the first intermediate busbar 15 and powers the electrical devices.

Under such conditions, the configuration module 46 generates a configuration signal HV_OK in the low state: the switch 30 is then non-conductive and the switch 31 is conductive.

Since the switch 31 is conductive, the intermediate voltage Vi (low intermediate voltage) is applied to the low-voltage port LV of the DC/DC converter 29. The second control module 45 operates the DC/DC converter 29 so that it converts the low intermediate voltage and produces a high output voltage level, which is thus delivered to the high voltage port HV. The DC/DC converter 29 is thus used as a step-up converter.

Likewise, since the control signal Sc1 is in the low state, the switch 35 is non-conductive while the switches 32 and 34 are conductive.

The high output voltage level as produced by the DC/DC converter 29 is thus applied to the second downstream busbar 18. The second power supply voltage Va2 is thus equal to the high output voltage level and it powers the second DC/DC converters 41 and thus the electric motors 13 of the hybrid ECS 6.

In contrast, since the control signal Sc1 is in the low state but the signal Gate is in the high state, the output of the NOR gate 60 is indeed in the low state and the switch 33 is non-conductive. The DC/AC converters 40 of the electrical taxiing system 5 are not powered. The voltage on the first downstream busbar 17 is zero and the first power supply voltage Va1 is zero.

Figure 5:
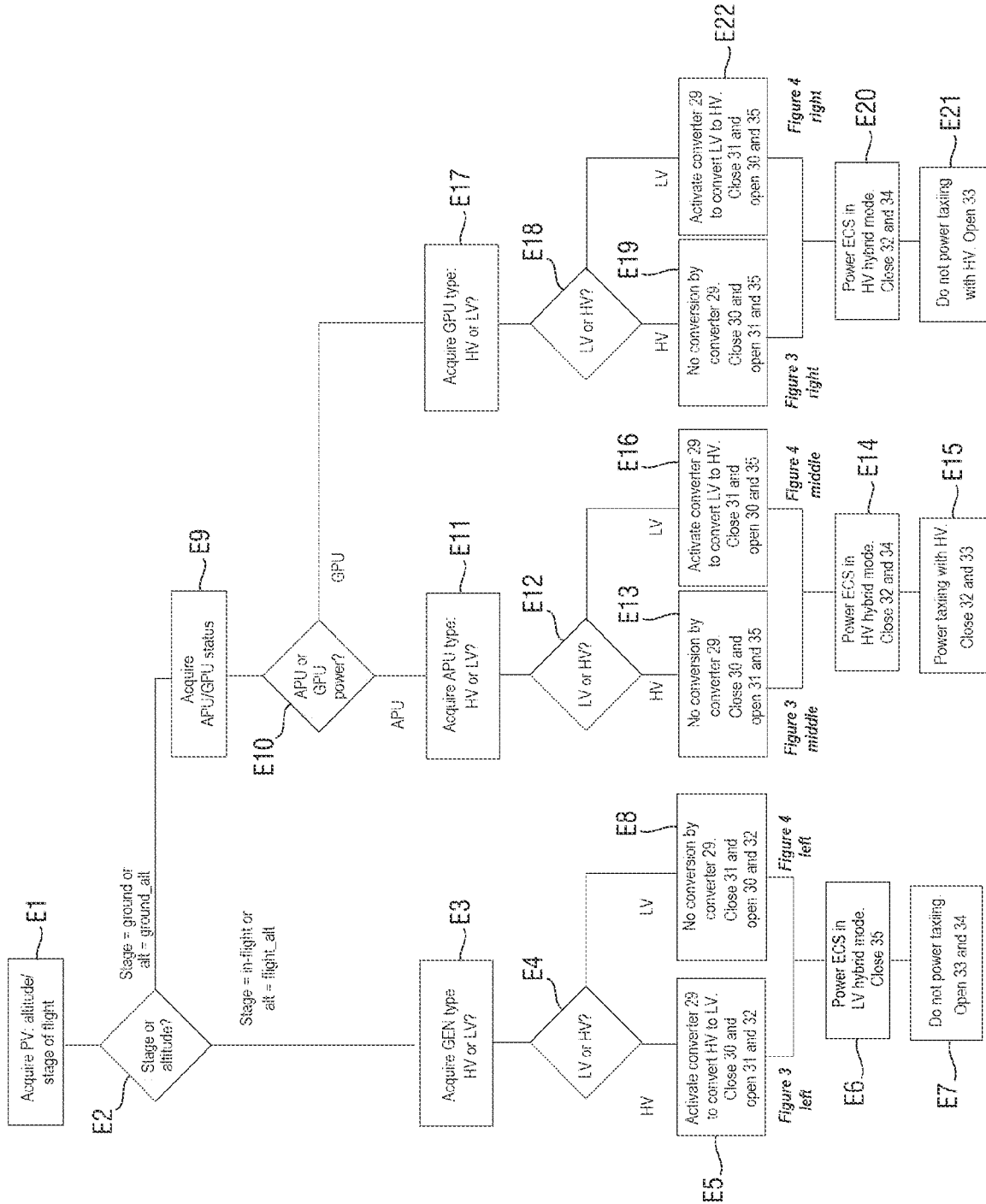
FIG. 5 shows steps in a configuration method.

With reference to FIG. 5, there follows a description of configuring the power supply system 1. The configuration method is performed by the control unit 3.

The control unit 3 acquires the flight parameter Pv that is representative of the altitude and/or the flight phase (step E1), and then checks the airplane's flight phase and/or altitude (step E2).

If the airplane is in the "in-flight" state, or if the altitude is a flight altitude (higher than some predetermined threshold), the control unit 3 acquires the information signal Gen representative of the main voltage level (step E3), and checks whether the main voltage level is a high level (high main voltage) or a low level (low main voltage), step E4.

If the level is a high level (as in the left-hand diagram of FIG. 3), the control unit 3 activates HV-to-LV conversion by the DC/DC converter 29 (voltage step-down converter). The switch 30 is closed and the switches 31 and 32 are opened (step E5).

The switch 35 is thus closed. The low output voltage level delivered by the DC/DC converter 29 powers the hybrid ECS 6 (step E6).

The switches 33 and 34 are opened. The electrical taxiing system 5 is not powered (step E7).

If the level is a low level (as in the left-hand diagram of FIG. 4), in step E4, the control unit 3 operates the DC/DC converter 29 so that it does not perform conversion. The switch 31 is closed and the switches 30 and 32 are opened (step E8). The method then moves to step E6.

In step E2, if the flight phase is a "ground" stage or if the altitude corresponds to the airplane being in a position on the ground, the control unit 3 acquires the state of the auxiliary source 10 (APU) and of the ground source 11 (step E9), and then determines which source is to be used (step E10).

If auxiliary source is available, the control unit 3 acquires a signal representative of the auxiliary voltage level (step E11) and checks whether the auxiliary voltage level is a high level (high auxiliary voltage) or a low level (low auxiliary voltage): step E12.

If the level is a high level (as in the middle diagram of FIG. 3), the control unit 3 does not activate conversion by the DC/DC converter 29. The switch 30 is closed and the switches 31 and 35 are opened (step E13).

The switches 32 and 34 are closed. The high output voltage level powers the hybrid ECS 6 (step E14).

The switches 32 and 33 are closed. The high output voltage level powers the electrical taxiing system 5 (step E15).

If the level is a low level (as in the middle diagram of FIG. 4), in step E12, the control unit 3 operates the DC/DC converter 29 so that it performs LV-to-HV conversion (step-up). The switch 31 is closed and the switches 30 and 35 are opened (step E16). The method then moves to step E14.

If it is the ground source 11 of that is available, in step E10, the control unit 3 acquires a signal representative of the voltage level of the ground source (step E17) and checks whether the GPU voltage level is a high level (high GPU voltage) or a low level (low GPU voltage): step E18.

If the level is a high level (as in the right-hand diagram of FIG. 3), the control unit 3 does not activate conversion by the DC/DC converter 29. The switch 30 is closed and the switches 31 and 35 are opened (step E19).

The switches 32 and 34 are closed. The high output voltage level powers the hybrid ECS 6 (step E20).

The switch 33 is thus opened. The electrical taxiing system 5 is not powered (step E21).

If the level is a low level (as in the right-hand diagram of FIG. 4), in step E18, the control unit 3 operates the DC/DC converter 29 so that it performs LV-to-HV conversion (step-up). The switch 31 is closed and the switches 30 and 35 are opened (step E22). The method then moves to step E20.

The power supply system of the invention is extremely advantageous for several reasons.

The DC/DC converter 29 serves to step up the voltage for powering the electrical taxiing system 5 on the ground (and also the hybrid ECS 6).

As explained above, stepping up the voltage level in this way reduces the amount of current that flows in the cables, and thus enables the gauges of the cables to be reduced. Cable sizes are optimized on the basis of the DC/DC converter 29.

Figure 6:
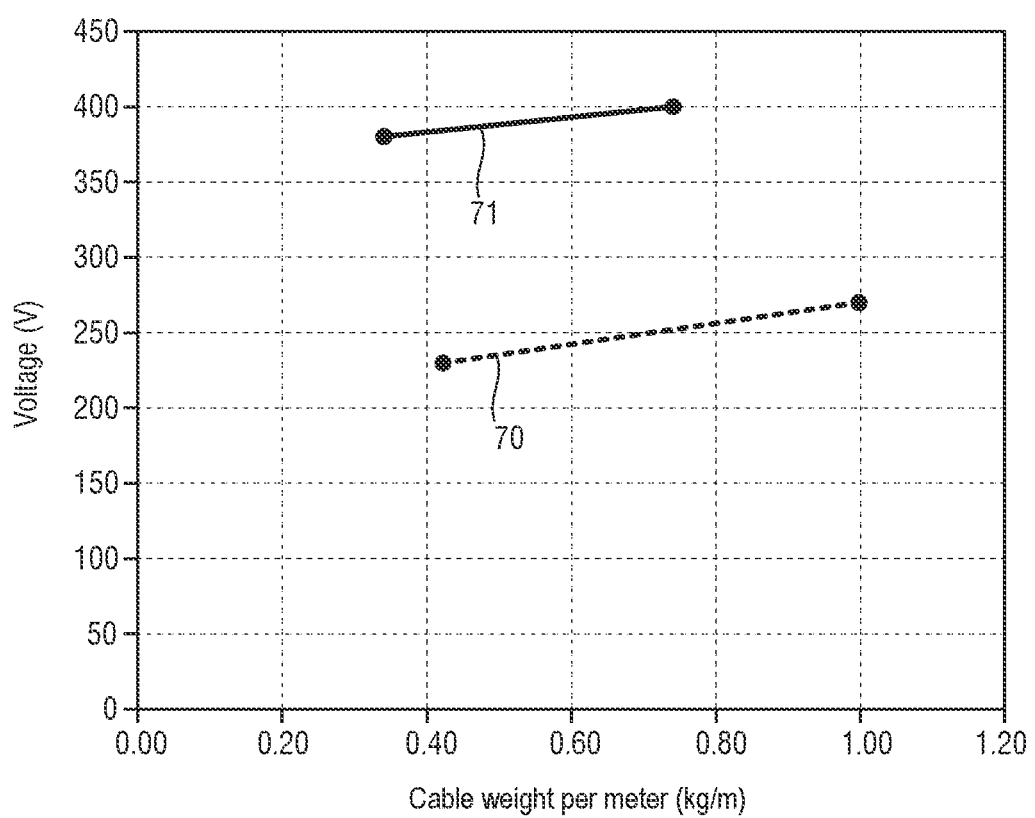
FIG. 6 shows a graph plotting curves giving cable weight per meter as a function of voltage level.

Reducing cable gauges serves to reduce the weight and the bulk of said cables. With reference to FIG. 6, calculations have been performed by way of example to determine cable weight per meter for two voltage levels: a low level 70, defined by an AC voltage of 230 VAC and a DC voltage of ±270 VDC, and a high level 71 defined by an AC voltage of 380 VAC and a DC voltage of ±400 VDC. In this example, it was assumed when performing these calculations that the electrical taxiing system 5 requires a total power equal to 100 kilowatts (kW). FIG. 6 shows clearly that increasing voltage makes it possible to decrease cable weight. The reduction in cable weight may be as much as 20% for cables conveying AC voltages and 26% for cables conveying DC voltages.

Naturally, these voltage levels are not limiting, and by way of example the DC voltage could be equal to ±800 VDC or ±1000 VDC with an AC voltage equal to 230 VAC.

By stepping up voltage, cable gauge can thus go from American wire gauge 1 (AWG1) to AWG2 for DC voltages, and from AWG6 to AWG8 for AC voltages.

Smaller cable gauges are also advantageous from the point of view of installing cables and equipment, since a smaller diameter cable is more flexible than a larger diameter cable. This property is highly advantageous while installing systems, in particular for the electrical taxiing system 5 where the equipment is located in positions that are difficult to access.

The electric cables of electrical equipment that is installed in a non-pressurized zone, such as a hybrid ECS, are subjected to their highest pressures while on the ground, where the DC/DC converter 29 thus serves advantageously to enable the voltage level to be stepped up so as to deliver a high voltage level that satisfies an optimum that has previously been determined in terms both of saving weight and also of ease of installing the electric cables of such equipment.

With the increasing amount of electrical power that is becoming available in airplanes, and given the present trend towards propulsion architectures that are more electrical or even fully electrified, such a power supply system that enables the voltage level of the power supply delivered to each of the various on-board electrical systems to be stepped up or stepped down as a function of the flight phase is well-suited to future airplane programs.

Nevertheless, and as also described above, stepping voltage up raises difficulties associated with electric discharge phenomena associated with the electric cables of electrical equipment that is installed in a non-pressurized zone, such as a hybrid ECS. These difficulties are made worse by the low pressures that exist at the altitudes at which aircraft fly.

Nevertheless, the invention enables these difficulties to be mitigated. Thus, above a certain altitude, the power supply system enables the voltage level to be stepped down so as to remain under the Paschen curve. By way of example, this can be seen in FIG. 3 where the voltage powering the hybrid ECS 6 is lower at altitude (the situation in the left-hand diagram) than on the ground (the situation in the middle diagram).

Figure 7:
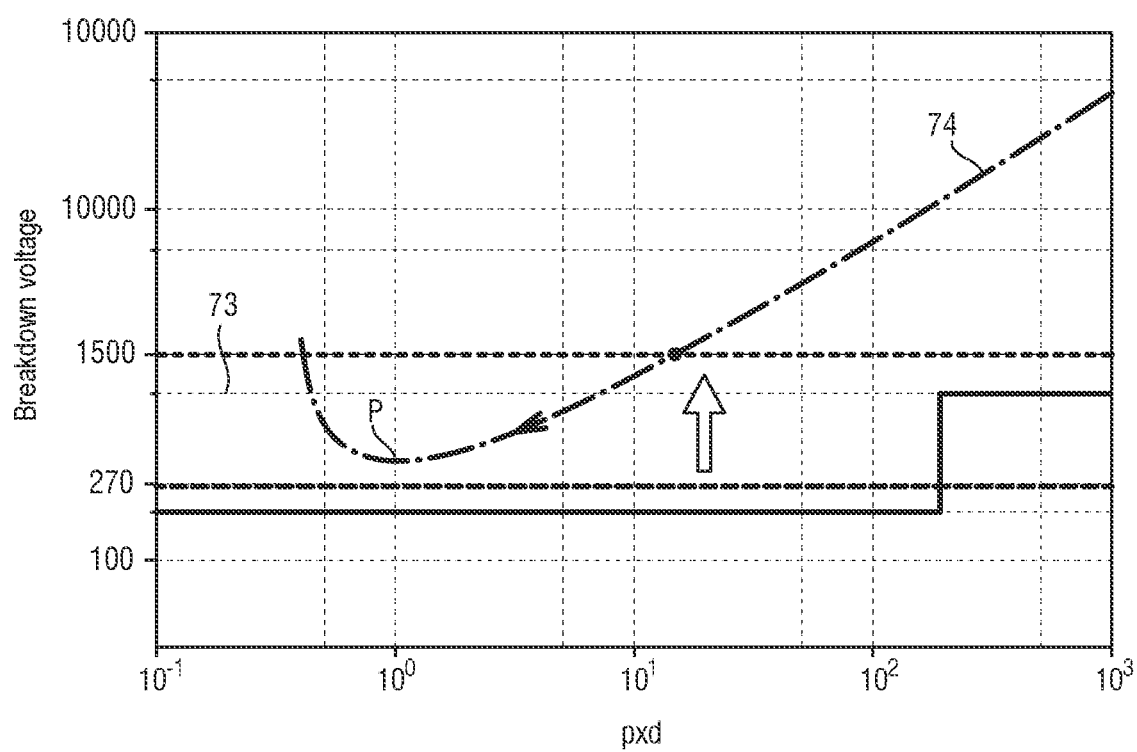
FIG. 7 shows a graph plotting the Paschen curve together with voltage levels situated beneath said curve.

With reference to FIG. 7, it is thus possible to define a voltage level 73 as a function having two predefined constant voltage levels that enable the voltage to be kept below the Paschen curve 74. It would also be possible not to use constant voltage levels but to define the voltage levels so that it remains below the Paschen curve 74 (the level could then increase after the point P while remaining below the Paschen curve 74).

This avoids the electric discharge zone.

This function could be provided by the DC/DC converter 29, and by the way it is controlled by the second control module 45. This solution is particularly relevant for the hybrid ECS 6, where the electrical power required decreases with altitude. This solution avoids adding weight due to any oversizing.

The problem of electric discharge is thus solved, without modifying existing cables or their insulation, even though the hybrid ECS 6 is installed in a non-pressurized zone.

Naturally, pooling the converter modules for powering various different systems serves to reduce the weight, the complexity, and the costs (recurring and non-recurring costs) of the systems.

The power supply system also constitutes a generic solution that can be implemented regardless of the voltage levels delivered by the power sources and regardless of the levels required by the electrical systems being powered. Specifically, the AC/DC converter 24 and the DC/DC converter 29 are configurable to produce voltage levels appropriate for multiple applications. Once more, this system serves not only to reduce the cost of systems significantly, but also to increase their reliability, since a system that is already field-proven in one aircraft program can be incorporated in another program.

The power supply system makes it possible to power various different portions of an electrical architecture simultaneously with different voltage levels.

Naturally, the architecture described is effective in all stages of an aircraft mission, from parking prior to takeoff, to parking after landing, and this is applicable regardless of whether or not the aircraft engine (s) is/are running.

The availability of the electrical system as powered by the power supply system is not reduced.

Naturally, the invention is not limited to the embodiment described but covers any variant coming within the ambit of the invention as defined by the claims.

The power supply system of the invention can be used to power any type of on-board electrical system that presents electricity consumption that depends on the aircraft's flight phase and/or altitude.

The invention claimed is:

1. A power supply system arranged to be incorporated in an aircraft by being connected to at least one AC voltage source and to at least one electrical system presenting electricity consumption that depends on the aircraft's flight phase and/or altitude, the power supply system comprising:
   a first converter module comprising an AC/DC converter and being arranged to produce an intermediate voltage from an input voltage produced by the AC voltage source;
   a second converter module comprising a DC/DC converter and being controllable to use the intermediate voltage to produce selectively at least two distinct output voltage levels; and
   a control unit arranged to acquire a flight parameter representative of the flight phase and/or of the altitude, and to control the power supply system in such a manner that the second converter module delivers to each electrical system a power supply voltage that depends on the flight parameter and on said electrical system, and that is equal to one of the output voltage levels.

2. The power supply system according to claim 1, wherein the output voltage levels comprise a first output voltage level that is equal to the intermediate voltage and a second output voltage level that results from the DC/DC converter converting the intermediate voltage.

3. The power supply system according to claim 1, wherein the control unit comprises both a control circuit comprising switches and logic gates, and also a first control module arranged to operate the control circuit as a function of the flight parameter.

4. The power supply system according to claim 2, wherein the control unit comprises a second control module arranged to control the DC/DC converter as a function of the flight parameter so that it either converts the intermediate voltage to produce the second output voltage level, or else performs no conversion.

5. The power supply system according to claim 4, the control unit being arranged to configure the second converter module in such a manner that the DC/DC converter operates selectively either as a step-down voltage converter, with the second output voltage level then being lower than the intermediate voltage, or else as a voltage step-up converter, with the second output voltage level then being higher than the intermediate voltage.

6. The power supply system according to claim 1, the DC/DC converter being a reversible converter.

7. The power supply system according to claim 1, wherein the AC/DC converter is arranged in such a manner that the intermediate voltage can be equal to different intermediate voltage levels, and wherein the control unit includes a configuration module arranged to configure the AC/DC converter in such a manner that the intermediate voltage is equal to one of the different intermediate voltage levels.

8. The power supply system according to claim 1, wherein the intermediate voltage is used for powering electrical devices other than the electrical system(s).

9. The power supply system according to claim 1, the power supply system being connected to a plurality of AC voltage sources, the control unit being arranged to operate the control circuit in such a manner as to select, as a function at least of the flight parameter, one of the AC voltage sources for delivering the input voltage to the first converter module.

10. The power supply system according to claim 9, the AC voltage sources comprising a main source, an APU type auxiliary source, and a ground source, the selection being performed as a function of the flight parameter and of the availability of the APU type auxiliary source.

11. The power supply system according to claim 1, the electrical system(s) comprising an electrical taxiing system.

12. The power supply system according to claim 1, the electrical system(s) comprising an air-conditioning system.

13. An aircraft comprising a power supply system arranged to be incorporated in an aircraft by being connected to at least one AC voltage source and to at least one electrical system presenting electricity consumption that depends on the aircraft's flight phase and/or altitude, the power supply system comprising:
- a first converter module comprising an AC/DC converter and being arranged to produce an intermediate voltage from an input voltage produced by the AC voltage source;
- a second converter module comprising a DC/DC converter and being controllable to use the intermediate voltage to produce selectively at least two distinct output voltage levels; and
- a control unit arranged to acquire a flight parameter representative of the flight phase and/or of the altitude, and to control the power supply system in such a manner that the second converter module delivers to each electrical system a power supply voltage that depends on the flight parameter and on said electrical system, and that is equal to one of the output voltage levels.

14. The power supply system according to claim 1, wherein the control unit is arranged to configure the second converter module such that the DC/DC converter operates selectively either as a step-down voltage converter, with the second output voltage level being lower than the intermediate voltage, or as a voltage step-up converter, with the second output voltage level being higher than the intermediate voltage.

15. The power supply system according to claim 1, wherein the AC/DC converter is arranged in such a manner that the intermediate voltage can be equal to different intermediate voltage levels.

16. The power supply system according to claim 1, wherein the control unit includes a configuration module arranged to configure the AC/DC converter in such a manner that the intermediate voltage is equal to one of the different intermediate voltage levels.

* * * * *